US011030991B2

(12) United States Patent
Chae

(10) Patent No.: US 11,030,991 B2
(45) Date of Patent: Jun. 8, 2021

(54) METHOD AND DEVICE FOR SPEECH PROCESSING

(71) Applicant: LG ELECTRONICS INC., Seoul (KR)

(72) Inventor: Jong Hoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/593,236

(22) Filed: Oct. 4, 2019

(65) Prior Publication Data

US 2020/0035217 A1 Jan. 30, 2020

(30) Foreign Application Priority Data

Aug. 8, 2019 (KR) ........................ 10-2019-0096783

(51) Int. Cl.
| | | |
|---|---|---|
| *G10L 13/033* | (2013.01) | |
| *G10L 15/22* | (2006.01) | |
| *G10L 13/047* | (2013.01) | |
| *G10L 15/16* | (2006.01) | |
| *G10L 15/18* | (2013.01) | |
| *G06F 40/30* | (2020.01) | |
| *G06F 40/211* | (2020.01) | |
| *G10L 13/00* | (2006.01) | |

(52) U.S. Cl.
CPC ........ *G10L 13/0335* (2013.01); *G06F 40/211* (2020.01); *G06F 40/30* (2020.01); *G10L 13/00* (2013.01); *G10L 13/047* (2013.01); *G10L 15/16* (2013.01); *G10L 15/1815* (2013.01); *G10L 15/22* (2013.01); *G10L 2015/223* (2013.01)

(58) Field of Classification Search
CPC ... G10L 13/0335; G10L 15/22; G10L 13/043; G10L 13/047; G10L 2015/223; G10L 15/16; G10L 15/1815; G06F 17/2785; G06F 17/271
See application file for complete search history.

(56) References Cited

U.S. PATENT DOCUMENTS 7,117,159 B1 * 10/2006 Packingham ........... G10L 13/00
704/275
2020/0364303 A1 * 11/2020 Liu ....................... G10L 15/063

FOREIGN PATENT DOCUMENTS

KR 10-2013-0051278 A 5/2013
KR 10-1819459 B1 1/2018

\* cited by examiner

*Primary Examiner* — Kevin Ky
(74) *Attorney, Agent, or Firm* — Birch, Stewart, Kolasch & Birch, LLP

(57) ABSTRACT

Disclosed are a speech processing method and a speech processing device, for performing speech processing by executing artificial intelligence (AI) algorithms and/or machine learning algorithms installed thereon, thus enabling the communication between a user terminal and a server in a 5G communication environment. The speech processing method according to an embodiment of the present disclosure includes receiving a user spoken utterance, outputting a voice actor spoken utterance in a voice actor's voice having the highest degree of similarity with a user's voice by using a user-voice actor mapping learning model, the voice actor spoken utterance corresponding to the user spoken utterance, and performing speech recognition for the voice actor spoken utterance.

18 Claims, 4 Drawing Sheets

METHOD AND DEVICE FOR SPEECH PROCESSING

CROSS-REFERENCE TO RELATED APPLICATION

This present application claims benefit of priority to Korean Patent Application No. 10-2019-0096783, entitled "METHOD AND DEVICE FOR SPEECH PROCESSING", filed on Aug. 8, 2019, in the Korean Intellectual Property Office, the entire disclosure of which is incorporated herein by reference.

BACKGROUND

1. Technical Field

The present disclosure relates to a speech processing method and a speech processing device, and more specifically, to a speech processing method and a speech processing device, which enhance speech recognition performance by performing speech recognition processing after converting a user's spoken utterance received in a preceding stage of the speech recognition processing to a voice actor's spoken utterance that is most similar to the user spoken utterance.

2. Description of Related Art

Speech consists of meaningful sounds made by humans as the most natural means by which we humans communicate, convey information, and realize language.

As there have been many continuous attempts since long ago to realize the communication between humans and machines through speech, in recent years, remarkable advances have been made in the field of speech information technology (SIT), permeating many aspects of daily life. Speech recognition, which is included in SIT technology, recognizes a spoken utterance and converts the spoken utterance to a text string. To assess the speech recognition function, utterances of a designated text by multiple speakers are recorded, and through recognition of the recorded utterances, a speech recognition rate can be measured.

Related Document 1 describes a speech recognition system and device capable of correcting errors in speech recognition, which recognizes speech and converts it to text, while displaying a real-time input state for correction and enabling convenient correction.

Related Document 2 describes a personalized text-to-speech (TTS) feature in which characteristics are extracted from the voice of an individual and stored, and when a text is received from said individual, said text is outputted in a specified voice.

Related Document 1 and Related Document 2 disclose a technology which receives speech and converts them to text for providing services corresponding thereto, but this technology is still prone to speech recognition errors due to distortions in the tone and/or pronunciations in user's utterances, and Related Document 1 and Related Document 2 do not disclose a technique for converting an utterance received at the beginning of speech recognition processing to a voice actor's utterance so as to reduce the occurrence of speech recognition errors.

The background art described above may be technical information retained by the present inventors in order to derive the present disclosure or acquired by the present inventors along the process of deriving the present disclosure, and thus is not necessarily a known art disclosed to the general public before the filing of the present application.

RELATED ART DOCUMENTS

Patent Documents

Related Art 1: Korean Patent Registration No. 10-1819459 (Jan. 17, 2018)
Related Art 2: Korean Patent Laid-Open Publication No. 10-2013-0051278 (May 20, 2013)

SUMMARY OF THE INVENTION

An aspect of the present disclosure is to address the shortcoming of the related art that is likely to cause speech recognition errors due to distortions in the tone and/or pronunciations in user's speech because the user's speech is not converted to voice actor's speech in a preceding stage of speech recognition processing.

Another aspect of the present disclosure is to enhance speech recognition performance by performing speech recognition processing after converting a user's spoken utterance received in a preceding stage of the speech recognition processing to a voice actor spoken utterance that is the most similar to the user's spoken utterance.

Another aspect of the present disclosure is to ensure reliable speech recognition performance by performing speech recognition processing after converting to a voice actor's voice having the highest degree of similarity with user's speech characteristics.

Another aspect of the present disclosure is to address, by using optimal process resources, the shortcoming of the related art that is likely to cause speech recognition errors due to distortions in the tone and/or pronunciations in user's speech because the user's speech is not converted to voice actor's speech in a preceding stage of speech recognition processing.

A speech processing method according to an embodiment of the present disclosure may include performing speech recognition processing after converting a user spoken utterance received in a preceding stage of the speech recognition processing to a voice actor spoken utterance that is most similar to the user spoken utterance.

More specifically, the speech processing method according to an embodiment of the present disclosure comprises: receiving a user spoken utterance; outputting a voice actor spoken utterance corresponding to the user spoken utterance in a voice actor's voice having the highest degree of similarity with a user's voice by using a user-voice actor mapping learning model; and performing speech recognition of the voice actor spoken utterance.

Through the speech processing method according to the present embodiment, speech recognition processing may be performed after converting the user spoken utterance received in a preceding stage of the speech recognition processing to a voice actor spoken utterance that is most similar to the user spoken utterance, thereby enhancing speech recognition performance.

In addition, the speech processing method according to the present embodiment further includes generating the user-voice actor mapping learning model prior to outputting the voice actor spoken utterance by using the user-voice actor mapping learning model, wherein the generating the user-voice actor mapping learning model includes: determining a voice actor's voice having the highest degree of similarity with the user spoken utterance by comparing characteristics information of the user spoken utterance to characteristics information of a plurality of voice actors' voices previously established in a database; receiving a user utterance text obtained by converting the user spoken utterance to text; generating a voice actor spoken utterance obtained by synthesizing the user utterance text with the voice actor's voice having the highest degree of similarity with the user spoken utterance; training a deep neural network model by using the user spoken utterance and the voice actor spoken utterance as a training data set; and storing the user-voice actor mapping learning model which outputs, through training the deep neural network, the user spoken utterance as the voice actor spoken utterance which is the user spoken utterance being uttered in the voice actor's voice having the highest degree of similarity with the user voice.

In addition, the speech processing method according to the present embodiment may further include, prior to determining the voice actor's voice having the highest degree of similarity with the user spoken utterance, generating the characteristics information of the user spoken utterance including at least one of tone, accent, gender, pitch, speed, or age of the user spoken utterance by analyzing the user spoken utterance.

In addition, the determining the voice actor's voice having the highest degree of similarity with the user spoken utterance may include determining the voice actor's voice having the highest degree of similarity with the user spoken utterance through comparison between characteristics information including at least one of tone, accent, gender, pitch, speed, or age of the user spoken utterance to characteristics information including at least one of tone, accent, gender, pitch, speed, or age of the plurality of voice actors' voices previously established in the database.

In addition, the determining the voice actor spoken utterance having the highest degree of similarity with the user spoken utterance may include extracting a characteristics vector of the user spoken utterance, comparing the characteristics vector of the user spoken utterance to each of characteristics vectors of the plurality of voice actors' voices previously established in the database, and determining a characteristics vector of a voice actor's voice having the highest degree of similarity with the characteristics vector of the user spoken utterance based on a result of comparing.

In addition, the performing the speech recognition for the voice actor spoken utterance may include: once the voice actor spoken utterance determined as corresponding to the user spoken utterance is outputted by executing the user-voice actor mapping learning model, generating a voice actor utterance text obtained by converting the voice actor spoken utterance to text; learning speech intent of the voice actor spoken utterance by performing syntactic analysis or semantic analysis on the voice actor utterance text; generating a response text by using a knowledge base corresponding to the speech intent; and converting the response text to a response spoken utterance in the form of natural language speech to output the response spoken utterance.

In addition, the speech processing method according to the present embodiment may further include determining whether to execute the user-voice actor mapping learning model on the basis of a predetermined condition.

In addition, the determining whether to execute the user-voice actor mapping learning model may include: on the basis of characteristics information of the user spoken utterance, executing the user-voice actor mapping learning model to monitor outputting of the voice actor spoken utterance determined as corresponding to the user spoken utterance; generating a voice actor utterance text obtained by converting the voice actor spoken utterance to text, learning speech intent of the voice actor spoken utterance by performing syntactic analysis or semantic analysis on the voice actor utterance text, generating a response text using a knowledge base corresponding to the speech intent, and monitoring a state in which where the response text is converted to and outputted as a response spoken utterance in the form of natural language speech; assessing speech recognition success/failure by monitoring user reaction information in response to outputting of the response spoken utterance; withholding execution of the user-voice actor mapping learning model if a speech recognition success rate is less than a reference value, wherein the speech recognition success rate is obtained by digitizing the speech recognition success/failure; and applying execution of the user-voice actor mapping learning model if the speech recognition success rate is greater than or equal to the reference value.

In addition, the assessing speech recognition success/failure may include assessing the speech recognition success/failure by monitoring the user reaction information from one or more of user image information which is obtained using a camera within a predetermined time or user speech information which is obtained using a microphone within a predetermined time, after outputting of the response spoken utterance.

In addition, the withholding execution of the user-voice actor mapping learning model may include: generating a user utterance text obtained by converting the user spoken utterance to text; learning a speech intent of the user spoken utterance by performing syntactic analysis or semantic analysis on the user utterance text; generating a response text by using a knowledge base corresponding to the speech intent; and converting the response text to a response spoken utterance in the form of natural language speech to output the response spoken utterance.

A speech processing device according to an embodiment of the present disclosure may include: a receiver receiving a user spoken utterance; a processor outputting, in a voice actor's voice having the highest degree of similarity with a user voice, a voice actor spoken utterance corresponding to the user spoken utterance by using a user-voice actor mapping learning model; and a speech recognizer performing speech recognition for the voice actor spoken utterance.

Through the speech processing device according to the present embodiment, speech recognition processing may be performed after converting the user spoken utterance received in a preceding stage of the speech recognition processing to a voice actor spoken utterance that is most similar to the user spoken utterance, thus enhancing speech recognition performance.

In addition, the speech processing device according to the present embodiment may further include a generator which generates the user-voice actor mapping learning model prior to outputting the voice actor spoken utterance by using the user-voice actor mapping learning model, wherein the generator is configured to: determine the voice actor's voice having the highest degree of similarity with the user spoken utterance through comparison between characteristics information of the user spoken utterance and characteristics information of a plurality of voice actors' voices previously established in a database; receive a user utterance text obtained by converting the user spoken utterance to text; generate a voice actor spoken utterance obtained by synthesizing the user utterance text with the voice actor's voice having the highest degree of similarity with the user spoken utterance; train a deep neural network model by using the user spoken utterance and the voice actor spoken utterance as a training data set; and store the user-voice actor mapping learning model which outputs, through training the deep neural network, the user spoken utterance as the voice actor spoken utterance which is the user spoken utterance uttered in the voice actor's voice having the highest degree of similarity with a user voice.

In addition, the generator may be configured to generate characteristics information including at least one of tone, accent, gender, pitch, speed, or age of the user spoken utterance, by analyzing the user spoken utterance prior to determining the voice actor's voice having the highest degree of similarity with the user spoken utterance.

In addition, the generator may be configured to, when determining the voice actor spoken utterance having the highest degree of similarity with the user spoken utterance, determine the voice actor's voice having the highest degree of similarity with the user spoken utterance by comparing the characteristics information including at least one of tone, accent, gender, pitch, speed, or age of the user spoken utterance, to the characteristics information including at least one of tone, accent, gender, pitch, speed, or age of the plurality of voice actors' voices previously established in the database.

In addition, the generator may be configured to, when determining the voice actor's voice having the highest degree of similarity with the user spoken utterance: extract a characteristics vector of the user spoken utterance; compare the characteristics vector of the user spoken utterance to each of characteristics vectors of the plurality of voice actors' voices previously established in the database; and determine a characteristics vector of a voice actor's voice, having a highest degree of similarity with the characteristics vector of the user spoken utterance based on a result of comparing.

In addition, the speech recognizer may include: an auto-speech recognizer generating a voice actor utterance text obtained by converting the voice actor spoken utterance to text when a voice actor spoken utterance determined as corresponding to the user spoken utterance is outputted by executing the user-voice actor mapping learning model; a natural language processor learning speech intent of the voice actor spoken utterance by performing syntactic analysis or semantic analysis on the voice actor utterance text; a natural language generator generating a response text by using a knowledge base corresponding to the speech intent; and a text-to-speech converter converting the response text to a response spoken utterance in the form of natural language speech to output the response spoken utterance.

In addition, the speech processing device according to the present embodiment may further include a determiner determining whether to execute the user-voice actor mapping learning model on the basis of a predetermined condition.

In addition, the determiner may be configured to: monitor on the basis of the characteristics information of the user spoken utterance, outputting of the voice actor spoken utterance determined as corresponding to the user spoken utterance by executing the user-voice actor mapping learning model; generate a voice actor utterance text obtained by converting the voice actor spoken utterance to text, learn speech intent of the voice actor spoken utterance by performing syntactic analysis or semantic analysis on the voice actor utterance text, generate a response text by using a knowledge base corresponding to the speech intent, and monitor a state in which the response text is converted to and outputted as a response spoken utterance in the form of natural language speech; assess speech recognition success/failure by monitoring user reaction information in response to outputting of the response spoken utterance; withholding execution of the user-voice actor mapping learning model if a speech recognition success rate, which is obtained by digitizing the speech recognition success/failure, is less than a reference value; and applying execution of the user-voice actor mapping learning model if the speech recognition success rate is greater than or equal to the reference value.

Further, the determiner may be configured to monitor the user reaction information from one or more of user image information obtained using a camera within a predetermined time or user speech information obtained using a microphone within a predetermined time, after the response spoken utterance is outputted, thereby assessing the success/failure of the speech recognition.

Further, the determiner may be configured to: generate, when withholding execution of the user-voice actor mapping learning model, a user utterance text obtained by converting the user spoken utterance to text; learn speech intent of the user spoken utterance by performing syntactic analysis or semantic analysis on the user utterance text; generate a response text using a knowledge base corresponding to the speech intent; and convert the response text to a response spoken utterance in the form of natural language speech and output the response spoken utterance.

Furthermore, other methods and systems for implementing the present disclosure may be provided, and a computer program for implementing such methods may be provided.

Aspects, features, and advantages of the present disclosure other than the ones mentioned previously will become more apparent with reference to the accompanying drawings, the appended claims, and the detailed description of the present disclosure.

According to the present disclosure, speech recognition errors may be prevented, which are likely to arise from distortions in the tone and/or pronunciations in user's voice for not converting the user's voice to a voice actor's voice in a preceding stage of speech recognition processing.

In addition, speech recognition performance may be enhanced by performing speech recognition processing after converting a user spoken utterance received in a preceding stage of the speech recognition processing to a voice actor spoken utterance that is most similar to the user spoken utterance.

In addition, reliable speech recognition performance may be ensured by performing speech recognition processing after converting to a voice actor's voice having the highest degree of similarity with user's utterance characteristics.

In addition, although the speech processing device itself is a mass-produced uniform product, since the user perceives the speech processing device as a personalized device, the effects of being a user-customized product may be produced.

In addition, in a variety of services provided through speech recognition processing, user satisfaction may be increased, and rapid and accurate speech recognition processing may be executed.

In addition, by allowing voice commands intended by the user to be recognized and processed using optimal processor resources only, power efficiency of the speech processing device may be increased.

Advantages of the present disclosure are not limited to the foregoing features, and any other advantages not mentioned will become more apparent from the following detailed description to those skilled in the art to which the present disclosure pertains.

BRIEF DESCRIPTIONS OF DRAWINGS

The above and other aspects, features, and advantages of the present disclosure will become apparent from the detailed description of the following aspects in conjunction with the accompanying drawings, in which.

DETAILED DESCRIPTION

Figure 1:
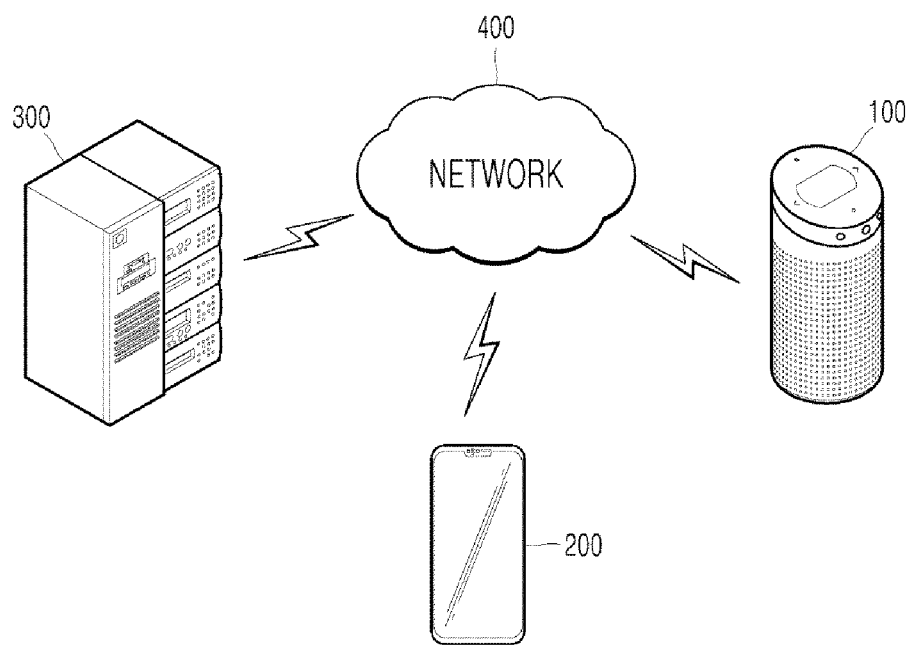
FIG. 1 is a diagram illustrating an example of a speech processing environment including an electronic device including a speech processing device according to an embodiment of the present disclosure, a server, and a network connecting the electronic device and the server to each other.

Advantages and features of the present disclosure and methods of achieving the advantages and features will be more apparent with reference to the following detailed description of embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is a diagram illustrating an example of a speech processing environment according to an embodiment of the present disclosure, including a speech processing device, a user terminal, a server, and a network connecting the speech recognition device, the user terminal, and the server to one another. Referring to FIG. 1, the speech recognition environment may include a speech processing device 100, a user terminal 200, a server 300, and a network 400. The speech processing device 100, the user terminal 200, and the server 300 may be connected to one another in a 5G communication environment. In addition, other than the devices illustrated in FIG. 1, various other electronic devices for use at home or office may be connected to each other and operate in an Internet-of-Things environment.

The speech processing device 100 may receive a user's spoken utterance and provide speech recognition services by recognition and analysis of the spoken utterance. In the present embodiment, the speech processing device 100 may include various other electronic devices capable of performing speech recognition function, such as artificial intelligence (AI) speakers and communication robots. In addition, the speech processing device 100 may act as a hub controlling the electronic devices not provided with voice input/output functionality. Here, the speech recognition services may include receiving a user spoken utterance, distinguishing an activation word and spoken sentences from each other, and outputting the speech recognition processing results with respect to the spoken sentences so as to be recognizable by the user.

In addition, the user spoken utterance may include an activation word and spoken sentences. The activation word is a specific command word that activates the speech recognition function and may be referred to as a wake-up word. An activation word needs to be included in the user spoken utterance for the speech recognition function to be activated, and if the user spoken utterance does not include an activation word, the speech recognition function remains in a deactivated state (for example, sleep mode). Such an activation word may be preset and stored in a memory (160 in FIG. 3) that will be described later.

In addition, the spoken sentence is a user's voice command which is processed after the speech recognition function of the speech processing device 100 is activated, and the speech processing device 100 may substantially process the voice command and generate an output. For example, if the user spoken utterance is "Hi LG, turn on the air conditioner", the activation word may be "Hi LG" and the spoken sentence may be "Turn on the air conditioner". The speech processing device 100 may receive and analyze user's spoken sentence to determine the presence of an activation word, and execute the spoken sentence to control an air conditioner (not illustrated) as an electronic device.

In the present embodiment, the speech processing device 100, while speech recognition function is activated upon receiving an activation word, may receive a user spoken utterance (spoken sentence without the activation word, herein referred to as user spoken utterance) and may output, in a voice actor's voice having the highest degree of similarity with a user's voice, a voice actor spoken utterance corresponding to the user spoken utterance by using a user-voice actor mapping learning model.

In the present embodiment, the speech processing device 100 may generate the user-voice actor mapping learning model prior to outputting the voice actor spoken utterance by using the user-voice actor mapping learning model. To generate the user-voice actor mapping learning model, the speech processing device 100 may determine a voice actor's voice having the highest degree of similarity with a user spoken utterance through comparison between characteristics information of the user spoken utterance and characteristics information of a plurality of voice actors' voices previously established in the database (154 in FIG. 4). Here, the characteristics information of the user spoken utterance may include at least one of tone, accent, gender, pitch, speed, or age of the user spoken utterance, which is generated by analyzing the user spoken utterance. The speech processing device 100 may receive a user utterance text obtained by converting the user spoken utterance to text, and may generate a voice actor spoken utterance obtained by synthesizing the user utterance text with a voice actor's voice having the highest degree of similarity with the user spoken utterance. The speech processing device 100 may train a deep neural network model by using the user spoken utterance and the voice actor spoken utterance as a training data set, and may store, in the memory (160 in FIG. 3), a user-voice actor mapping learning model which outputs, through training a deep neural network, the user spoken utterance as the voice actor spoken utterance, wherein the voice actor spoken utterance is the user spoken utterance uttered in the voice actor's voice having the highest degree of similarity with the user spoken utterance.

Here, the user-voice actor mapping learning model may be stored in a memory of the speech processing device 100 or may be stored on the server 300 to be executed by request of the speech processing device 100, and a result thereof may be transferred to the speech processing device 100.

The speech processor 100 may execute the user-voice actor mapping learning model to perform speech recognition for the voice actor spoken utterance determined as corresponding to the user spoken utterance, and may output a result of speech recognition execution so as to be recognizable by a user.

In the present embodiment, the speech processing device 100, which has speech recognition function activated after receiving the activation word, may autonomously perform speech recognition function and output speech recognition processing results as described above, or may transfer a user spoken utterance to the server 300 and receive speech recognition processing results from the server 300 to output the same.

The user terminal 200, after connecting to a speech processing application or a speech processing site, may monitor the status information of the speech processing device 100 through an authentication process, or may be provided with a service for operating or controlling the speech processing device 100. In the present invention, for example, when receiving the user spoken utterance, the user terminal 200 having completed the authentication process may determine the operation mode of the speech processing device 100 to operate the speech processing device 100 or control the operation of the speech processing device 100.

The user terminal 200 may include but is not limited to a communication terminal capable of performing functions of a computing device (not illustrated), and the user terminal 200 in the present embodiment may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Also, the user terminal 200 may be a wearable terminal implemented with communication function and data processing function, in the form of a watch, glasses or goggles, a hairband, a ring, or the like. The user terminal 200 is not limited to the above-mentioned devices, and thus any terminal that supports web browsing may be used as the user terminal 200.

The server 300 may be a database server which provides big data required for applications of various artificial intelligence algorithms, data on speech recognition, and the like. Furthermore, the server 300 may include a web server or application server that enables remote control of the speech processing device 100 by using an application or web browser installed on the user terminal 200.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, that are capable of learning, making predictions, and enhancing its own performance on the basis of experiential data. Machine learning algorithms, rather than only executing rigidly-set static program commands, may be used to take an approach that builds models for deriving predictions and decisions from inputted data.

The server 300 may receive a user spoken utterance from the speech processor 100 and output, in a voice actor's voice having the highest degree of similarity with a user's voice, a voice actor spoken utterance corresponding to the user spoken utterance by using a user-voice actor mapping learning model. Here, the user-voice actor mapping learning model may be stored on the server 300. The server 300 may execute speech recognition for the voice actor spoken utterance and transmit the speech recognition processing result to the speech processing device 100.

The speech processing device 100, depending on the processing capacity thereof, may output the voice actor spoken utterance corresponding to the user spoken utterance by using the user-voice actor mapping learning model, and the speech recognition execution for the voice actor spoken utterance may be at least in part executed by the speech processing device 100.

The network 400 may serve to connect the speech processing device 100, the user terminal 200, and the server 300 to one another. The network 400, for example, includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. Also, the network 400 may transmit or receive data using short-range communication and/or long-range communication technologies. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as the Internet, as well as a private network such as a secure corporate private network, for example, a multiple network environment. Access to the network 400 may be provided through one or more wire-based or wireless access networks. Further, the network 400 may support 5G communication and/or an Internet of things (IoT) network for exchanging and processing information between distributed components such as objects.

Figure 2:
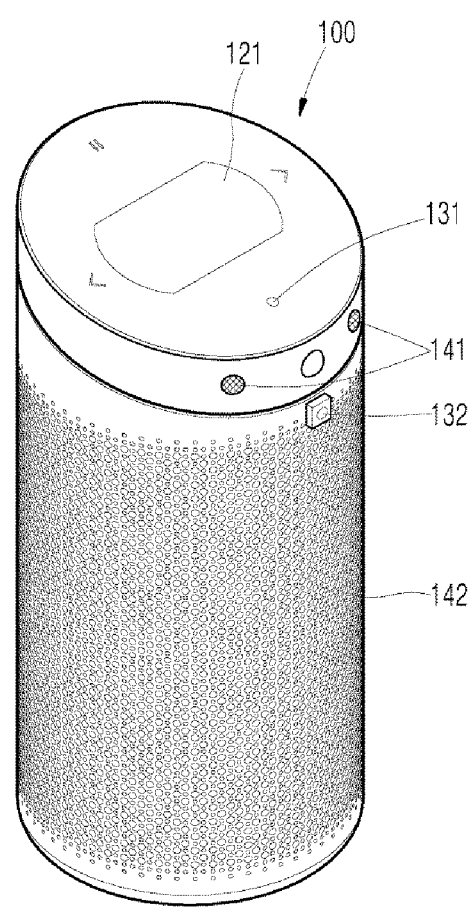
FIG. 2 is a diagram illustrating an example of an outer appearance of a speech processing device according to an embodiment of the present disclosure.
Figure 3:
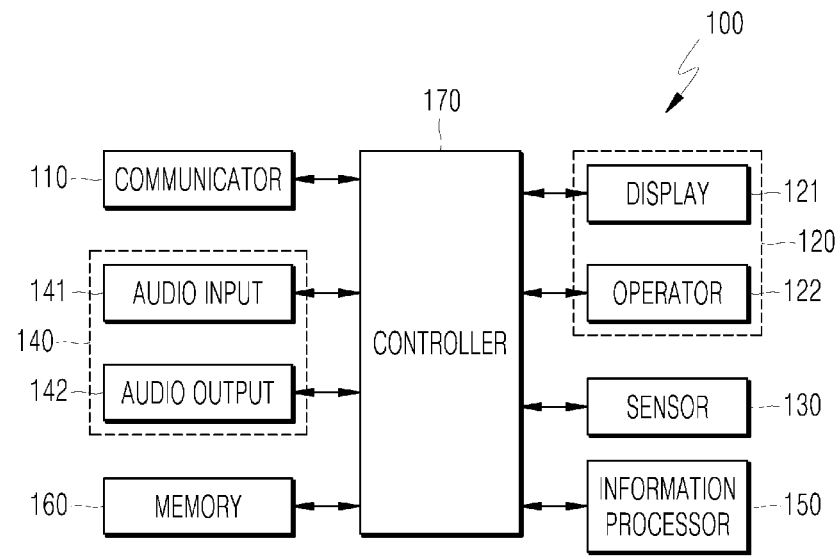
FIG. 3 is a schematic block diagram of a speech processing device according to an embodiment of the present disclosure.

FIG. 2 is a diagram illustrating an external appearance of a speech processing device according to an example embodiment of the present disclosure, and FIG. 3 is a block diagram schematically illustrating a speech processing device according to an example embodiment of the present disclosure. Hereinbelow, a description of the parts previously described with reference to FIG. 1 will be omitted. Referring to FIG. 2 and FIG. 3, the speech processing device 100 may include a communicator 110, an user interface 120 including a display 121 and an operator 122, a sensor 130, an audio processor 140 including an audio INPUT 141 and an audio OUTPUT 142, an information processor 150, a memory 160, and a controller 170.

The communicator 110 may provide, in connection with the network 400, a communication interface required for providing transmission/reception signals between the speech processing device 100 and/or the user terminal 200 and/or the server 300 in the form of data packets. Moreover, the communicator 110 may receive a predetermined information request signal from the user terminal 200, and may transmit the information processed by the speech processing device 100 to the user terminal 200. In addition, the communicator 110 may transmit a predetermined information request signal from the user terminal 200 to the server 300 and may receive a response signal processed by the server 300 and transmit the same to the user terminal 200. The communicator 110 may be a device that includes hardware and software required for transmission/reception of signals such as control signals, data signals, and so forth, with other network devices through wire-based or wireless connections.

Furthermore, the communicator 110 may support a variety of object-to-object intelligent communication (Internet of things (IoT), Internet of everything (IoE), Internet of small things (IoST), etc.), and may support machine to machine (M2M) communication, vehicle to everything (V2X) communication, device to device (D2D) communication, etc.

The display 121 in the user interface 120 may display the operation state of the speech processing device 100 under control of the controller 170. In some embodiments, the display 121 may consist of a touchscreen which forms an interlayer structure with a touchpad. In this case, the display 170 may be utilized, not only as an output device, but also as an input device through which data can be inputted by a user's touch. To this end, the display 121 may be configured as a touch recognition display controller or various other input/output controllers. For example, the touch-sensitive display controller may provide an output interface and an input interface between an apparatus and a user. The touch-sensitive display controller may transmit/receive electric signals to/from the controller 170. Furthermore, the touch-sensitive display controller displays a visual output to the user, wherein the visual output may include a text, graphic, image, video, and a combination thereof. Such the display 121 may be a predetermined display member such as, for example, a touch-sensitive organic light emitting display (OLED), liquid crystal display (LCD), or light emitting display (LED).

The operator 122 in the user interface 120 may include a plurality of operation buttons (not illustrated) and may transmit the signal corresponding to an inputted button to the controller 170. Such the operator 122 may be composed of a sensor, a button, or a switch structure capable of recognizing user's touch or press operation. In the present example, the operator 122 may transmit, to the controller 170, operation signals which the user operates to confirm or modify various information displayed on the display 121, regarding the operation of the speech processing device 100.

The sensor 130 may include a variety of sensors for sensing the environment surrounding the speech processing device 100, and may include a proximity sensor 131 and an image sensor 132. The proximity sensor 131 may acquire data on the location of an object (for example, a user) located around the speech processing device 100 by using far-infrared rays or the like. Furthermore, user location data acquired by the proximity sensor 131 may be stored in the memory 160.

The image sensor 132 may include a camera (not illustrated) capable of capturing an image of the surrounding of the speech processing device 100, and for image-capturing efficiency, a plurality of cameras may be provided therein. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image, but also a dynamic image formed of frames of static images. Meanwhile, the image captured and acquired by the camera serving as the image sensor 132 may be stored in the memory 160.

In the present embodiment, the sensor 130 is limited to the proximity sensor 131 and the image sensor 132, but may also include at least one of other sensors capable of sensing the surrounding environment of the speech processing device 100, and examples of such sensors, although not illustrated, include a Lidar sensor, a weight sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environment sensor (for example, a barometer, a hygrometer, a thermometer, a radiation sensor, a heat sensor, a gas sensor, etc.), a chemical sensor (for example, an electronic nose, a health-care sensor, a biometric sensor, etc.). Meanwhile, in the present embodiment, the speech processing device 100 may utilize a combination of information sensed from at least two or more sensors among the above sensors.

The audio INPUT 141 in the audio processor 140 may have a user spoken utterance (for example, an activation word and a spoken sentence) inputted thereto and transmit the same to the controller 170, and the controller 170 may transmit the user spoken utterance to the information processor 150. To this end, the audio INPUT 141 may be provided with one or more microphones (not illustrated).

Further, there may be a plurality of microphones (not illustrated) provided for more accurate reception of a user spoken utterance. Here, the plurality of microphones may be spaced apart from each other in different positions and may process the user spoken utterance as electric signals.

In some alternative embodiments, the audio INPUT 141 may use various noise removal algorithms in order to remove the noise generated in the process of receiving the user spoken utterance. In some alternative embodiments, the audio INPUT 141 may include a variety of components for voice signal processing, such as a filter (not illustrated) for removing noise when receiving the user spoken utterance, and an amplifier (not illustrated) for amplifying signals outputted from the filter and outputting the same.

The audio OUTPUT 142 in the audio processor 140 may output the following as audio under control of the controller 170, for example, an alarm sound, notification messages regarding an operation mode, an operation state, an error state, etc., response information corresponding to user utterance information, processing results corresponding to user spoken utterances (voice commands), etc. The audio OUTPUT 142 may convert electric signals from the controller 170 into audio signals and output the same. To this end, the audio OUTPUT 152 may be provided with a speaker or the like.

The speech processor 150 may receive a user spoken utterance and output, in a voice actor's voice having the highest degree of similarity with a user voice, a voice actor spoken utterance corresponding to the user spoken utterance by using a user-voice actor mapping learning model. In the present embodiment, the speech processor 150 may generate the user-voice actor mapping learning model prior to outputting the voice actor spoken utterance by using the user-voice actor mapping learning model. The speech processor 150 may execute the user-voice actor mapping learning model to perform speech recognition for the voice actor spoken utterance determined as corresponding to the user spoken utterance, and may output a result of speech recognition execution so as to be recognizable by a user.

In the present embodiment, the information processor 150 may perform training in connection with the controller 170, or may receive training results from the controller 170. In the present embodiment, the information processor 150 may be provided outside the controller 170 as illustrated in FIG. 3, or may be provided inside the controller 170 and operate similarly as the controller 170, or may be provided within the server 300 of FIG. 1. The information processor 150 will be described in greater detail with reference to FIG. 4.

The memory 160 may include a volatile or non-volatile recording medium for storing various information required for the operation of the speech processing device 100. For example, the memory 160 may store a preset activation word for determining the presence of an activation word in a user spoken utterance. Meanwhile, the activation word may be set by the manufacturer. For example, "Hi LG" may be set as the activation word, and may be changed by the user. Such an activation word is inputted in order to activate the speech processing device 100, and the speech processing device 100, upon recognizing the activation word uttered by a user, may switch to a speech recognition activated state.

In addition, the memory 160 may store a user spoken utterance (activation word and spoken utterance) being received through the audio INPUT 141, may store information sensed by the sensor 130, may store information processed by the information processor 150, and may store the user-voice actor mapping learning model.

Here, the memory 160 may include magnetic storage media or flash storage media, but the scope of the present disclosure is not limited thereto. The memory 160 as described above may include an internal memory and/or an external memory, and may further include volatile memory such as DRAM, SRAM, or SDRAM; non-volatile memory such as one time programmable ROM (OTPROM), PROM, EPROM, EEPROM, mask ROM, flash ROM, NAND flash memory, and NOR flash memory; a flash drive such as SSD, a compact flash (CF) card, a SD card, a micro-SD card, a mini-SD card, an Xd card, or a memory stick, or a storage device such as HDD.

Here, simple speech recognition may be executed by the speech processing device 100 and advanced speech recognition, such as natural language processing and the like, may be executed on the server 300. For example, if the user spoken utterance includes a preset activation word only, the speech processing device 100 may activate speech recognition function and switch to a state ready to receive spoken sentences. In this case, the speech processing device may execute the speech recognition process up to an activation word voice input, and the following speech recognition with respect to the spoken sentence may be executed through the server 300. Since the system resource of the speech processing device 100 is limited, complex natural language recognition and processing may be executed through the server 300.

The controller 170 may transfer the user spoken utterance received through the audio INPUT 141 to the information processor 150, and may provide the speech recognition processing results from the information processor 150 as visual information through the display 121 or as audio information through the audio OUTPUT 142.

The controller 170 is a type of a central processor which may drive a control software provided in the memory 160 to control an overall operation of the speech processing device 100. The controller 170 may include devices of all kinds capable of processing data, such as a processor. Here, the 'processor' may refer to a data processing device built in a hardware, which includes physically structured circuits in order to perform functions represented as a code or command contained in a program. Examples of the data processing device built in a hardware include, but are not limited to, processing devices such as a microprocessor, a central processor (CPU), a processor core, a multiprocessor, an application-specific integrated circuit (ASIC), a field programmable gate array (FPGA), and the like.

In the present embodiment, to enable the speech processing device 100 to output a result of optimal speech recognition processing, the controller 170 may perform machine learning, such as deep learning, with respect to the user's spoken utterance, and the memory 160 may store data being used in machine learning, result data, and the like.

A deep learning technology, which is a type of machine learning, may perform learning to a deep level in stages on the basis of data. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

As described above, the controller 170 may be provided with an artificial neural network and perform machine learning-based user recognition and user's voice recognition using received audio input signals as input data.

The controller 170 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The controller 170 may control to have a tone artificial neural network structure to be updated after learning.

Figure 4:
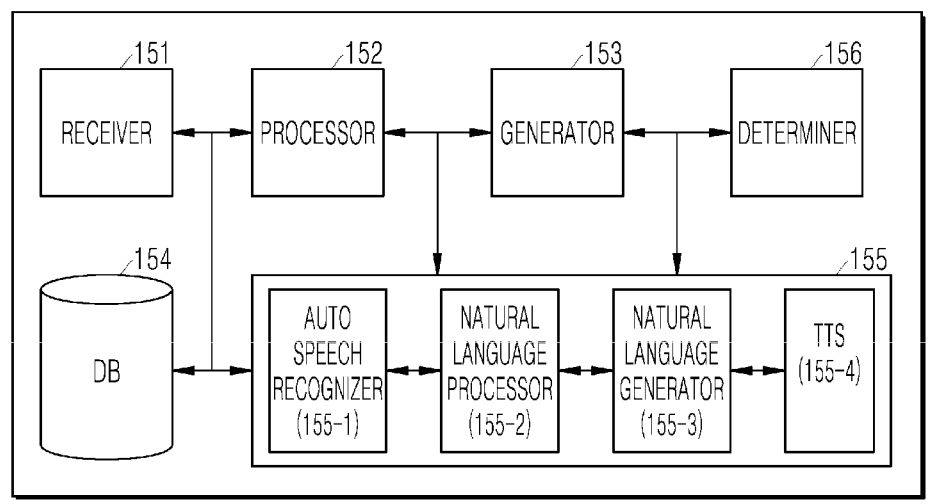
FIG. 4 is a schematic block diagram of an information processor of the speech processing device shown in FIG. 3 according to an example embodiment.

FIG. 4 is a schematic block diagram of an information processor of the speech processing device shown in FIG. 3 according to an example embodiment. In the following description, a description of the parts previously described with reference to FIG. 1 and FIG. 3 will be omitted. Referring to FIG. 4, the information processor 150 may include the receiver 151, the processor 152, the generator 153, the database 154, the speech recognizer 155, and the determiner 156.

The receiver 151 may receive a user's spoken utterance being inputted through the audio INPUT 141.

The processor 152 may output a voice actor spoken utterance corresponding to the user's spoken utterance, in a voice actor's voice having the highest degree of similarity with the user's voice by using a user-voice actor mapping learning model.

The generator 153 may generate the user-voice actor mapping learning model to be executed in the processor 152. The generator 153 may further include an analyzing unit (not illustrated) for generating the user-voice actor mapping learning model. The analyzing unit may analyze the received user's spoken utterance to generate characteristics information of the user's spoken utterance. The characteristics information of the user's spoken utterance may include at least one of tone, accent, gender, pitch, speed, or age of the user's spoken utterance.

The analyzing unit may generate the characteristics information of the user's spoken utterance, including the tone thereof, by analyzing word endings and word stems in the user's spoken utterance. The analyzing unit may generate the characteristics information of the user's spoken utterance, including the accent thereof, by analyzing word endings, word stems and a pitch in the user's spoken utterance and/or the received user utterance text. The analyzing unit may generate the characteristics information of the user's spoken utterance, including the gender and pitch thereof, by analyzing the pitch of the user's spoken utterance. The analyzing unit may generate the characteristics information of the user's spoken utterance, including the utterance speed thereof, by analyzing a word count and a unit time associated with the user's spoken utterance and/or the user utterance text. The analyzing unit may generate the characteristics information of the user's spoken utterance, including the age associated therewith, by analyzing a spectrum of the user's spoken utterance.

In the present embodiment, the user-voice actor mapping learning model is generated by the generator 153, and upon completion of generating the characteristics information of the user's spoken utterance received by the analyzing unit, the processor 152 may execute the user-voice actor mapping learning model. In some embodiments, the user-voice actor mapping learning model may be previously stored in the memory 160 and once the analyzing unit completes the generation of the characteristics information of the user's spoken utterance, the processor 152 may load the user-voice actor mapping learning model from the memory 160 and execute the same. Further, the user-voice actor mapping learning model may be stored on the server 300, and once the analyzing unit completes the generation of the characteristics information of the user's spoken utterance, the speech processing device 100 may request execution of the user-voice actor mapping learning model to the server 300 and may receive a result of the execution of the user-voice actor mapping learning model from the server 300.

The generator 153 may determine a voice actor's voice having the highest degree of similarity with the user's spoken utterance through comparison between the characteristics information of the user's spoken utterance being outputted from the analyzing unit and the characteristics information of a plurality of voice actor's voices previously established in the database 154.

In particular, when determining the voice actor's voice having the highest degree of similarity with the user's spoken utterance, the generator 153 may determine the voice actor's voice having the highest degree of similarity with the user's spoken utterance through comparison between the characteristics information including at least one of the tone, accent, gender, pitch, speed, or age of the user's spoken utterance and the characteristics information previously established in the database, including at least one of the tone, accent, gender, pitch, speed, or age of the plurality of voice actor's voices.

In some embodiments, when determining the voice actor's voice having the highest degree of similarity with the user's spoken utterance, the generator 153 may extract a characteristics vector of the user's spoken utterance and compare the characteristics vector of the user's spoken utterance to each of characteristics vectors of the plurality of voice actor's voices previously established in the database 154, and based on the result of comparison, may determine the characteristics vector of the voice actor's voice having the highest degree of similarity with the characteristics vector of the user's spoken utterance.

The generator 153 may receive a user utterance text obtained by converting the user's spoken utterance to text, and may generate a voice actor spoken utterance obtained by synthesizing the received user utterance text with the voice actor's voice having the highest degree of similarity with the user's spoken utterance. The generator 153 may use the text-to-speech unit 155-4 included in the speech recognizer 155 to generate the voice actor spoken utterance.

The generator 153 may train a deep neural network model by using the characteristics information of the user's spoken utterance and characteristics information of the voice actor spoken utterance as a training data set. In particular, the characteristics information of the voice actor spoken utterance may be received through the analyzing unit or may be previously stored in the database 154.

The generator 153 may generate a user voice-actor mapping learning model and store the same in the memory 160, wherein the user-voice actor mapping learning model outputs, through training a deep neural network, the user's spoken utterance as a voice actor spoken utterance which is obtained by having the user's spoken utterance uttered in the voice actor's voice having the highest degree of similarity with the user's voice.

Once the processor 152 executes the user-voice actor mapping learning model and outputs the voice actor spoken utterance determined as corresponding to the user's spoken utterance, the speech recognizer 155 may perform speech recognition processing for the voice actor spoken utterance.

In the present embodiment, the speech recognizer 155 may include an auto-speech recognition (ASR) unit 155-1, a natural language processor 155-2, a natural language generator 155-3, and a text-to-speech (TTS) unit 155-4.

The ASR unit 155-1 may generate a voice actor utterance text obtained by converting the voice actor spoken utterance to text. In the present embodiment, the ASR unit 155-1 may execute speech-to-text (STT) conversion. The ASR unit 155-1 may convert the voice actor spoken utterance outputted from the processor 152 to the voice actor utterance text. In the present embodiment, the ASR unit 155-1 may include a speech recognizer (not illustrated). The speech recognizer may include an acoustic model and a language model. For example, the acoustic model may include vocalization-related information, and the language model may include unit phoneme information and information about a combination of the unit phoneme information. The speech recognizer may use the information on vocalizations and the sound unit information to convert a voice actor spoken utterance to a voice actor utterance text. For example, the information on the acoustic model and the language model may be stored in automatic speech recognition database (not illustrated) in the ASR unit 155-1.

The natural language processor 155-2 may perform syntactic analysis or semantic analysis on the voice actor utterance text to analyze the speech intent of the voice actor spoken utterance, that is, the speech intent of the user's spoken utterance. Here, the syntactic analysis may divide a query text into syntactic units (e.g., words, phrases, morphemes, etc.), and may recognize syntactic elements that the divided units have. The semantic analysis may be performed using semantic matching, rule matching, formula matching, or the like. Accordingly, the natural language processor 155-2 may obtain parameters required for learning the intent behind a voice actor utterance text or parameters required for expressing such an intent.

The natural language generator 155-3 may generate a response text corresponding to the voice actor utterance text by using a knowledge base on the basis of the speech intent analyzed by the natural language processor 155-2.

The text-to-speech unit 155-4 may generate a response spoken utterance obtained as a result of converting the response text to a response spoken utterance in the form of natural language speech, generated by the natural language generator 155-3, and may output the response spoken utterance through an audio OUTPUT 142.

The determiner 156 may determine whether to execute the user-voice actor mapping learning model which is executed by the processor 152. The determiner 156 may determine whether to execute the user-voice actor mapping learning model on the basis of a predetermined condition, and may withhold execution of the user-voice actor mapping learning model if the predetermined condition is not met. More specifically, withholding the user-voice actor mapping learning model may include performing speech recognition processing by using a regular speech recognition model, which will be described later. The determiner 156 may apply execution of the user-voice actor mapping learning model if the predetermined condition is met.

The determiner 156 may perform the following processing with an aid from other components, in order to determine whether to execute the user-voice actor mapping learning model. The determiner 156 may monitor the operation of the processor 152. That is, the determiner 156 may monitor output of the user-voice actor mapping learning model which outputs the user's spoken utterance as a voice actor spoken utterance which is obtained by having the user's spoken utterance uttered in the voice actor's voice having the highest degree of similarity with the user's voice.

The determiner 156 may monitor the operation of the speech recognizer 155. That is, the determiner 156 may generate a voice actor utterance text obtained by converting a voice actor spoken utterance to text; perform syntactic analysis or semantic analysis on the voice actor utterance text to learn a speech intent of the voice actor spoken utterance; using a knowledge base corresponding to the speech intent, generate a response text; and monitor a state in which the response text is converted to and outputted as a response spoken utterance in the form of natural language speech.

The determiner 156 may monitor user reaction information after outputting the response spoken utterance through the audio OUTPUT 142, to assess speech recognition success/failure. The determiner 156 may assess speech recognition success/failure by monitoring the user reaction information from at least one of user image information or user speech information. Here, the user image information is obtained using a camera (image sensor 132) within a predetermined time (for example, five seconds) after the response spoken utterance is outputted through the audio OUTPUT 142, and the user speech information is obtained using a microphone (audio INPUT 141) within a predetermined time after the response spoken utterance is outputted through the audio OUTPUT 142.

In the present embodiment, the user reaction information may include information on a user's reaction with regard to whether the response spoken utterance is outputted according to the user's speech intent Such user reaction information may be expressed in terms of the user's gestures and/or user's voice. In addition, the user reaction information may include, positive reaction information wherein satisfaction with regard to the response spoken utterance outputted according to the user's speech intent is expressed through user's gestures and/or voice; negative reaction information wherein dissatisfaction with regard to the response spoken utterance outputted according to the user's speech intent is expressed through user's gestures and/or voice; and neutral reaction information wherein neither satisfaction nor dissatisfaction with regard to the response spoken utterance outputted according to the user's speech intent is expressed through user's gestures and/or voice. In the present embodiment, the determiner 156 may determine speech recognition success/failure by comparing relatively to each other the positive reaction information and the negative reaction information that have accumulated over a predetermined time, in response to the output of a response spoken utterance with respect to similar user spoken utterances.

The determiner 156 may withhold execution of the user-voice actor mapping learning model and perform speech recognition processing using a regular speech recognition model if a speech recognition success rate, which is obtained by digitizing the speech recognition success/failure, is less than a reference value. To perform the speech recognition processing using a regular speech recognition model, the speech recognizer 155 may generate a user utterance text obtained by converting the user spoken utterance to text; learn speech intent of the user spoken utterance by performing syntactic analysis or semantic analysis on the user utterance text; generate a response text by using a knowledge base corresponding to the speech intent; and convert the response text to a response spoken utterance in the form of natural language speech to output the response spoken utterance.

Alternatively, the determiner 156 may perform execution of the user-voice actor mapping learning model if the speech recognition success rate is greater than or equal to the reference value.

Figure 5:
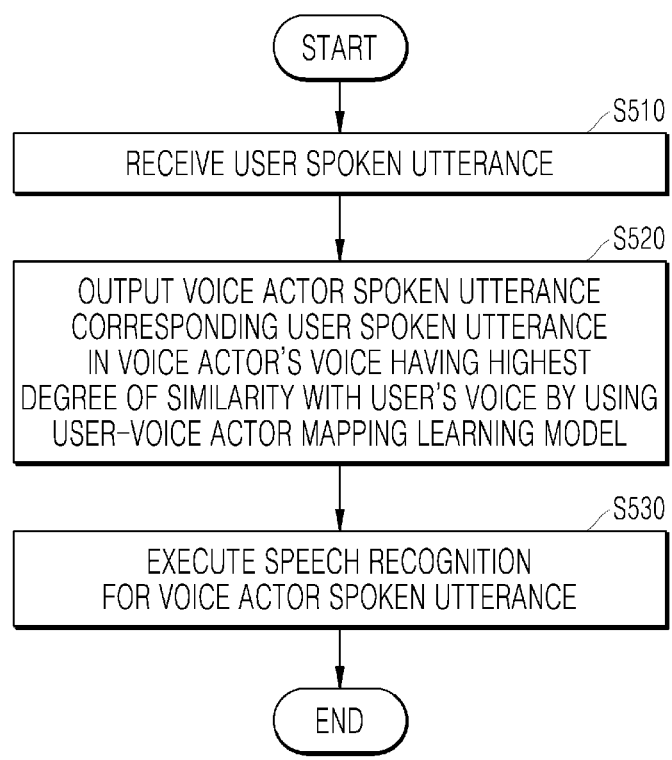
FIG. 5 is a flowchart of a speech processing method according to an embodiment of the present disclosure.

FIG. 5 is a flowchart of a speech processing method according to an embodiment of the present disclosure. In the following description, a description of the parts previously described with reference to FIG. 1 and FIG. 4 will be omitted.

Referring to FIG. 5, in S510, the speech processing device 100 receives a user spoken utterance.

In S520, the speech processing device 100 outputs, in a voice actor's voice having the highest degree of similarity with a user voice, a voice actor spoken utterance corresponding to the user spoken utterance by using a user-voice actor mapping learning model.

Here, the speech processing device 100 may generate the user-voice actor mapping learning model prior to outputting the voice actor spoken utterance by using the user-voice actor mapping learning model. The speech processing device 100 may determine a voice actor's voice having the highest degree of similarity with a user spoken utterance by comparing characteristics information of the user spoken utterance to characteristics information of a plurality of plurality of voice actors' voices previously established in the database (154 in FIG. 4). Here, the characteristics information of the user spoken utterance may contain at least one of tone, accent, gender, pitch, speed, or age of the user spoken utterance, which is generated by analyzing the user spoken utterance. The speech processing device 100 may receive a user utterance text obtained by converting the user spoken utterance to text, and may generate a voice actor spoken utterance obtained by synthesizing the user utterance text with a voice actor's voice having the highest degree of similarity with the user spoken utterance. The speech processing device 100 may train a deep neural network model by using the user spoken utterance and the voice actor spoken utterance as a training data set, and may store a user-voice actor mapping learning model which outputs, through training the deep neural network model, the user spoken utterance as the voice actor spoken utterance, wherein the voice actor spoken utterance is the user spoken utterance uttered in the voice actor's voice having the highest degree of similarity with the user spoken utterance.

In S530, the speech processing device 100 may execute the user-voice actor mapping learning model to perform speech recognition for the voice actor spoken utterance determined as corresponding to the user spoken utterance, and may output a result of execution of speech recognition so as to be recognizable by a user. The speech processing device 100 may perform speech recognition as follows: Once the voice actor spoken utterance determined as corresponding to the user spoken utterance is outputted by executing the user-voice actor mapping learning model, the speech processing device 100 may generate a voice actor utterance text which is the voice actor spoken utterance converted to text. The speech processing device 100 may learn speech intent of the voice actor spoken utterance by performing syntactic analysis or semantic analysis on the voice actor utterance text. The speech processing device 100 may generate a response text by using a knowledge base corresponding to the speech intent. The speech processing device 100 may convert the response text to a response spoken utterance in the form of natural language speech and output the response spoken utterance.

In some embodiments, the speech processing device 100 may determine, on the basis of a predetermined condition, whether to execute the user-voice actor mapping learning model. The speech processing device 100 may monitor, on the basis of the characteristics information of the user spoken utterance, the outputting of the voice actor spoken utterance which is determined as corresponding to the user spoken utterance by executing the user-voice actor mapping learning model.

The speech processing device 100 may generate a voice actor utterance text obtained by converting the voice actor spoken utterance to text, learn speech intent of the voice actor spoken utterance by performing syntactic analysis or semantic analysis on the voice actor utterance text, generate a response text using a knowledge base corresponding to the speech intent, and monitor a state in which the response text is converted to and outputted as a response spoken utterance in the form of natural language speech.

The speech processing device 100 may assess speech recognition success/failure by monitoring user reaction information in response to the outputted response spoken utterance, and may withhold execution of the user-voice actor mapping learning model if a speech recognition success rate, which is obtained by digitizing the speech recognition success/failure, is less than a reference value. In order to execute speech recognition processing using a regular speech recognition model, the speech processing device 100 may generate a user utterance text obtained by converting the user spoken utterance to text, learn speech intent of the user spoken utterance by performing syntactic analysis or semantic analysis on the user utterance text, generate a response text by using a knowledge base corresponding to the speech intent, and convert the response text to a response spoken utterance in the form of natural language speech to output the response spoken utterance.

The speech processing device 100 may perform execution of the user-voice actor mapping learning model if the speech recognition success rate is greater than or equal to the reference value.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

REFERENCES

100: SPEECH PROCESSING DEVICE
200: USER TERMINAL
300: SERVER
400: NETWORK

What is claimed is:

1. A speech processing method, comprising:
   receiving a user spoken utterance;
   outputting, in a voice actor's voice having a highest degree of similarity with a user voice, a voice actor spoken utterance corresponding to the user spoken utterance by using a user-voice actor mapping learning model; and
   performing speech recognition for the voice actor spoken utterance,
   wherein the performing the speech recognition for the voice actor spoken utterance comprises:
   once the voice actor spoken utterance determined as corresponding to the user spoken utterance is output by executing the user-voice actor mapping learning model, generating voice actor utterance text obtained by converting the voice actor spoken utterance to text;
   learning speech intent of the voice actor spoken utterance by performing syntactic analysis or semantic analysis on the voice actor utterance text;
   generating a response text by using a knowledge base corresponding to the speech intent; and
   converting the response text to a response spoken utterance in a form of natural language speech to output the response spoken utterance.

2. The speech processing method of claim 1, further comprising generating the user-voice actor mapping learning model prior to outputting the voice actor spoken utterance by using the user-voice actor mapping learning model,
   wherein the generating the user-voice actor mapping learning model comprises:
   determining the voice actor's voice having the highest degree of similarity with the user spoken utterance through comparison between characteristics information of the user spoken utterance and characteristics information of a plurality of voice actors' voices previously established in a database;
   receiving a user utterance text obtained by converting the user spoken utterance to text;
   generating the voice actor spoken utterance obtained by synthesizing the user utterance text with the voice actor's voice having the highest degree of similarity with the user spoken utterance;
   training a deep neural network model by using the user spoken utterance and the voice actor spoken utterance as a training dataset; and
   storing the user-voice actor mapping learning model, wherein the user-voice actor mapping learning model, through training the deep neural network, outputs the user spoken utterance as the voice actor spoken utterance being uttered in the voice actor's voice having the highest degree of similarity with the user voice.

3. The speech processing method of claim 2, further comprising, prior to determining the voice actor's voice having the highest degree of similarity with the user spoken utterance, generating the characteristics information, which includes at least one of tone, accent, gender, pitch, speed, or age of the user spoken utterance, by analyzing the user spoken utterance.

4. The speech processing method of claim 3, wherein the determining the voice actor's voice having the highest degree of similarity with the user spoken utterance comprises determining the voice actor's voice having the highest degree of similarity with the user spoken utterance through comparison between characteristics information including at least one of tone, accent, gender, pitch, speed, or age of the user spoken utterance and characteristics information including at least one of tone, accent, gender, pitch, speed, or age of the plurality of voice actors' voices previously established in the database.

5. The speech processing method of claim 3, wherein the determining the voice actor's voice having the highest degree of similarity with the user spoken utterance comprises:
   extracting a characteristics vector of the user spoken utterance;
   comparing the characteristics vector of the user spoken utterance to each of characteristics vectors of the plurality of voice actors' voices previously established in the database; and
   determining a characteristics vector of a voice actor's voice having the highest degree of similarity with the characteristics vector of the user spoken utterance based on a result of comparing.

6. The speech processing method of claim 1, further comprising determining whether to execute the user-voice actor mapping learning model based on a predetermined condition.

7. The speech processing method of claim 6, wherein the determining whether to execute the user-voice actor mapping learning model comprises:
based on characteristics information of the user spoken utterance, executing the user-voice actor mapping learning model to monitor outputting of the voice actor spoken utterance determined as corresponding to the user spoken utterance;
generating the voice actor utterance text obtained by converting the voice actor spoken utterance to text, learning the speech intent of the voice actor spoken utterance by performing syntactic analysis or semantic analysis on the voice actor utterance text, generating the response text using the knowledge base corresponding to the speech intent, and monitoring a state in which where the response text is converted to and output as the response spoken utterance in the form of natural language speech;
assessing speech recognition success/failure by monitoring user reaction information in response to outputting of the response spoken utterance;
withholding execution of the user-voice actor mapping learning model if a speech recognition success rate is less than a reference value, wherein the speech recognition success rate is obtained by digitizing the speech recognition success/failure; and
applying execution of the user-voice actor mapping learning model if the speech recognition success rate is greater than or equal to the reference value.

8. The speech processing method of claim 7, wherein the assessing the speech recognition success/failure comprises assessing the speech recognition success/failure by monitoring the user reaction information from one or more user image information obtained using a camera within a predetermined time or user speech information obtained using a microphone within a predetermined time, after outputting of the response spoken utterance.

9. The speech processing method of claim 7, wherein the withholding execution of the user-voice actor mapping learning model comprises:
generating a user utterance text obtained by converting the user spoken utterance to text;
learning a speech intent of the user spoken utterance by performing syntactic analysis or semantic analysis on the user utterance text;
generating a response text based on the speech intent of the user spoken utterance by using a knowledge base corresponding to the speech intent of the user spoken utterance; and
converting the response text based on the speech intent of the user spoken utterance to a response spoken utterance corresponding to the speech intent of the user spoken utterance in the form of natural language speech to output the response spoken utterance corresponding to the speech intent of the user spoken utterance.

10. A speech processing device, comprising:
a receiver receiving a user spoken utterance;
a processor configured to output a voice actor spoken utterance in a voice actor's voice having a highest degree of similarity with a user voice by using a user-voice actor mapping learning model, the voice actor spoken utterance corresponding to the user spoken utterance; and
a speech recognizer performing speech recognition for the voice actor spoken utterance,
wherein the speech recognizer comprises:
an auto-speech recognizer configured to generate voice actor utterance text obtained by converting the voice actor spoken utterance to text when the voice actor spoken utterance determined as corresponding to the user spoken utterance is output by executing the user-voice actor mapping learning model;
a natural language processor configured to learn speech intent of the voice actor spoken utterance by performing syntactic analysis or semantic analysis on the voice actor utterance text;
a natural language generator configured to generate a response text by using a knowledge base corresponding to the speech intent; and
a text-to-speech converter configured to convert the response text to a response spoken utterance in a form of natural language speech to output the response spoken utterance.

11. The speech processing device of claim 10, further comprising a generator configured to generate the user-voice actor mapping learning model prior to outputting the voice actor spoken utterance by using the user-voice actor mapping learning model, wherein
the generator is further configured to:
determine the voice actor's voice having the highest degree of similarity with the user spoken utterance through comparison between characteristics information of the user spoken utterance and characteristics information of a plurality of voice actors' voices previously established in a database;
receive a user utterance text obtained by converting the user spoken utterance to text;
generate the voice actor spoken utterance obtained by synthesizing the user utterance text with the voice actor's voice having the highest degree of similarity with the user spoken utterance;
train a deep neural network model by using the user spoken utterance and the voice actor spoken utterance as a training dataset; and
store the user-voice actor mapping learning model, wherein the user-voice actor mapping learning model outputs, through training the deep neural network, the user spoken utterance as the voice actor spoken utterance, the voice actor spoken utterance uttered in the voice actor's voice having the highest degree of similarity with the user spoken utterance.

12. The speech processing device of claim 11, wherein the generator is further configured to generate characteristics information including at least one of tone, accent, gender, pitch, speed, or age of the user spoken utterance, by analyzing the user spoken utterance prior to determining the voice actor's voice having the highest degree of similarity with the user spoken utterance.

13. The speech processing device of claim 12, wherein the generator is further configured to: when determining the voice actor spoken utterance having the highest degree of similarity with the user spoken utterance, determine the voice actor's voice having the highest degree of similarity with the user spoken utterance by comparing the characteristics information including at least one of tone, accent, gender, pitch, speed, or age of the user spoken utterance, to the characteristics information including at least one of tone, accent, gender, pitch, speed, or age of the plurality of voice actors' voices previously established in the database.

14. The speech processing device of claim 12, wherein the generator is further configured to:
   when determining the voice actor's voice having the highest degree of similarity with the user spoken utterance:
   extract a characteristics vector of the user spoken utterance;
   compare the characteristics vector of the user spoken utterance to each of characteristics vectors of the plurality of voice actors' voices previously established in the database; and
   determine a characteristics vector of a voice actor's voice, having the highest degree of similarity with the characteristics vector of the user spoken utterance based on a result of comparing.

15. The speech processing device of claim 10, further comprising a determiner configured to determine whether to execute the user-voice actor mapping learning model based on a predetermined condition.

16. The speech processing device of claim 15, wherein the determiner is further configured to:
   monitor, based on the characteristics information of the user spoken utterance, outputting of the voice actor spoken utterance determined as corresponding to the user spoken utterance by executing the user-voice actor mapping learning model;
   generate the voice actor utterance text obtained by converting the voice actor spoken utterance to text, learn the speech intent of the voice actor spoken utterance by performing syntactic analysis or semantic analysis on the voice actor utterance text, generate the response text by using the knowledge base corresponding to the speech intent, and monitor a state in which the response text is converted to and output as the response spoken utterance in the form of natural language speech;
   assess speech recognition success/failure by monitoring user reaction information in response to outputting of the response spoken utterance;
   withhold execution of the user-voice actor mapping learning model if a speech recognition success rate is less than a reference value, the speech recognition success rate being obtained by digitizing the speech recognition success/failure; and
   apply execution of the user-voice actor mapping learning model if the speech recognition success rate is greater than or equal to the reference value.

17. The speech processing device of claim 16, wherein the determiner is further configured to assess the speech recognition success/failure by monitoring the user reaction information from one or more of user image information obtained using a camera within a predetermined time or user speech information obtained using a microphone within a predetermined time, after outputting of the response spoken utterance.

18. The speech processing device of claim 16, wherein the determiner is further configured to:
   generate a user utterance text obtained by converting the user spoken utterance to text when withholding execution of the user-voice actor mapping learning model;
   learn speech intent of the user spoken utterance by performing syntactic analysis or semantic analysis on the user utterance text;
   generate a response text based on the speech intent of the user spoken utterance by using a knowledge base corresponding to the speech intent of the user spoken utterance; and
   convert the response text based on the speech intent of the user spoken utterance to a response spoken utterance in the form of natural language speech to output the response spoken utterance corresponding to the speech intent of the user spoken utterance.

\* \* \* \* \*